US011411258B2

(12) United States Patent
Taylor et al.

(10) Patent No.: US 11,411,258 B2
(45) Date of Patent: Aug. 9, 2022

(54) PULSE REVERSE CURRENT HIGH RATE ELECTRODEPOSITION AND CHARGING WHILE MITIGATING THE ADVERSE EFFECTS OF DENDRITE FORMATION

(71) Applicant: Faraday Technology, Inc., Englewood, OH (US)

(72) Inventors: Earl Jennings Taylor, Troy, OH (US); Maria E. Inman, Yellow Springs, OH (US); Timothy D. Hall, Englewood, OH (US); Danny Xin Liu, Tipp City, OH (US)

(73) Assignee: Faraday Technology, Inc., Englewood, OH (US)

( * ) Notice: Subject to any disclaimer, the term of this patent is extended or adjusted under 35 U.S.C. 154(b) by 518 days.

(21) Appl. No.: 16/560,172

(22) Filed: Sep. 4, 2019

(65) Prior Publication Data

US 2020/0076010 A1  Mar. 5, 2020

Related U.S. Application Data

(60) Provisional application No. 62/727,105, filed on Sep. 5, 2018.

(51) Int. Cl.
*C25C 7/06* (2006.01)
*H01M 10/44* (2006.01)
(Continued)

(52) U.S. Cl.
CPC ............... *H01M 10/44* (2013.01); *C25C 7/06* (2013.01); *H01M 4/0447* (2013.01); *H01M 10/052* (2013.01)

(58) Field of Classification Search
None
See application file for complete search history.

(56) References Cited

U.S. PATENT DOCUMENTS 5,084,144 A  1/1992 Reddy et al.
6,080,504 A  6/2000 Taylor et al.
(Continued)

OTHER PUBLICATIONS

Mayers M. et al., Suppression of Dendrite Formation via Pulse Charging in Rechargeable Lithium Metal Batteries, Journal of Physical Chemistry C, 2012, 116 (50), pp. 26214-26221.
(Continued)

*Primary Examiner* — Brian R Ohara
*Assistant Examiner* — Patrick Marshall Greene
(74) *Attorney, Agent, or Firm* — Iandiorio Teska & Coleman, LLP

(57) ABSTRACT

The problem of high rate electrodeposition of metals such as copper during electrowinning operations or high rate charging of lithium or zinc electrodes for rechargeable battery applications while avoiding the adverse effects of dendrite formation such as causing short-circuiting and/or poor deposit morphology is solved by pulse reverse current electrodeposition or charging whereby the forward cathodic (electrodeposition or charging) pulse current is "tuned" to minimize dendrite formation for example by creating a smaller pulsating boundary layer and thereby minimizing mass transport effects leading to surface asperities and the subsequent reverse anodic (electropolishing) pulse current is "tuned" to eliminate the micro- and macro-asperities leading to dendrites.

3 Claims, 12 Drawing Sheets

(51) Int. Cl.
*H01M 10/052* (2010.01)
*H01M 4/04* (2006.01)

(56) References Cited

U.S. PATENT DOCUMENTS

| | | | |
|---|---|---|---|
| 6,203,684 B1 | 3/2001 | Taylor et al. | |
| 6,210,555 B1 | 4/2001 | Taylor et al. | |
| 6,303,014 B1 | 10/2001 | Taylor et al. | |
| 6,309,528 B1 | 10/2001 | Taylor et al. | |
| 6,319,384 B1 | 11/2001 | Taylor et al. | |
| 6,402,931 B1 | 6/2002 | Zhou et al. | |
| 6,524,461 B2 | 2/2003 | Taylor et al. | |
| 6,551,485 B1 | 4/2003 | Taylor | |
| 6,558,231 B1 | 5/2003 | Taylor | |
| 6,652,727 B2 | 11/2003 | Taylor et al. | |
| 6,750,144 B2 | 6/2004 | Taylor | |
| 6,827,833 B2 | 12/2004 | Taylor et al. | |
| 6,863,793 B2 | 3/2005 | Taylor et al. | |
| 6,878,259 B2 | 4/2005 | Taylor et al. | |
| 7,022,216 B2 | 4/2006 | Taylor et al. | |
| 8,603,315 B2 | 12/2013 | Taylor et al. | |
| 9,006,147 B2 | 4/2015 | Taylor et al. | |
| 9,761,861 B1 | 9/2017 | Holme et al. | |
| 9,987,699 B2 | 6/2018 | Taylor et al. | |
| 10,298,047 B2 | 5/2019 | Yuan et al. | |
| 2002/0038764 A1* | 4/2002 | Taylor | C25D 5/18 205/291 |
| 2004/0004006 A1* | 1/2004 | Taylor | H01L 21/7684 257/E21.309 |
| 2017/0338465 A1 | 11/2017 | Holme et al. | |
| 2019/0221895 A1 | 7/2019 | Konopka et al. | |

OTHER PUBLICATIONS

Aryanfar, A. et al. Dynamics of Lithium Dendrite Growth and Inhibition: Pulse Charging Experiments and Monte Carlo Calculations, Journal of Physical Chemistry Letters, 2014, 5, pp. 1721-1726.

Keil et al. Charging Protocols for Lithium-ion Batteries and Their Impact on Cycle Life—An Experimental Study with Different 18650 High-Power Cells, Journal of Energy Storage 6, 2016, pp. 125-141.

Yang, et al., Effects of Pulse Plating on Lithium Electrodeposition, Morphology and Cycling Efficiency, Journal of Power Sources, 272, 2014, pp. 900-908.

Li et al., Understanding the Molecluar Mechanism of Pulse Current Charging for Stable Lithium-Metal Batteries, Science Advances, 2017;3: e1701246, Jul. 21, 2017, nine (9) pages.

Bl0mgren, George E., The Development and Future of Lithium Ion Batteries, Journal of the Electrochemical Society, 164(1), pp. A5019-A5025 (2017).

Harry et al., Detection of Subsurface Structures Underneath Dendrites Formed on Cycled Lithium Metal Electrodes, Nature Materials, vol. 13, Jan. 2014, pp. 69-73.

Bai, et al., Transition of Lithium Growth Mechanisms in Liquid Electrolytes, The Royal Society of Chemistry 2016; Energy & Environmental Science 2016, 9, pp. 3221-3229.

Bhatt et al., Understanding the Morphological Changes of Lithium Surfaces During Cycling in Electrolyte Solutions of Lithium Salts in an Ionic Liquid, Journal of the Electrochemical Society, 160, (8) 2013 pp. A1171-A1180.

Engerizer CR2023, Product Datasheet, Form No. 2032NA0618.
Duracel DL 2025, Lithium/Manganese Dioxide Battery, Duracell, Inc. www.duracellnpt.com DL2025-1/97.

* cited by examiner

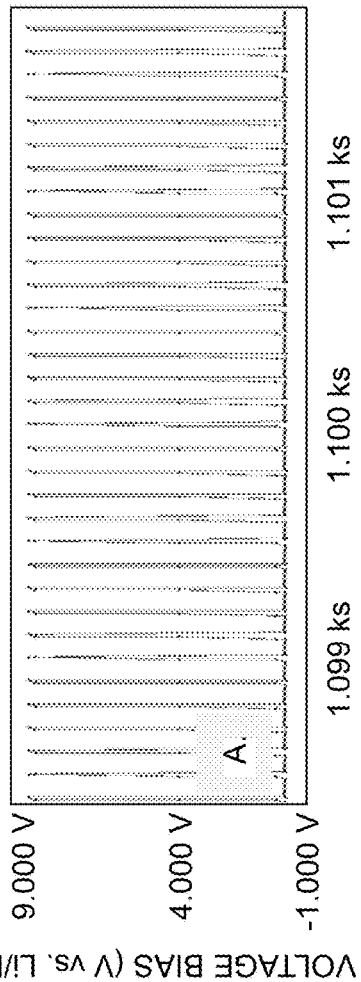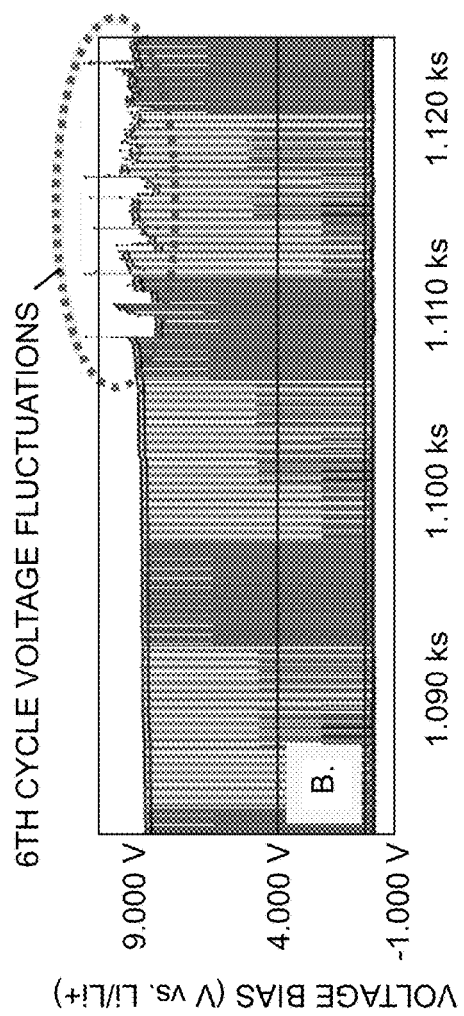
FIG. 11A
FIG. 11B

PULSE REVERSE CURRENT HIGH RATE ELECTRODEPOSITION AND CHARGING WHILE MITIGATING THE ADVERSE EFFECTS OF DENDRITE FORMATION

RELATED APPLICATIONS

This application claims benefit of and priority to U.S. Provisional Application Ser. No. 62/727,105 filed Sep. 5, 2018, under 35 U.S.C. §§ 119, 120, 363, 365, and 37 C.F.R. § 1.55 and § 1.78, which is incorporated herein by this reference.

GOVERNMENT RIGHTS

This invention was made with Government support under contract FA8650-19-P-2024 awarded by USAF/AFMC, AFRL Wright Research Site. The Government has certain rights in the invention.

FIELD OF THE INVENTION

This subject invention relates to high rate electrodeposition processes such as electrowinning in general and to high rate charging of batteries in particular.

BACKGROUND OF THE INVENTION

Everyone desires faster charging lithium batteries. The market is worldwide and includes commercial (portable power and electric vehicles) and military applications.

The market for lithium-ion batteries in 2010 was reported to be approximately $11 billion, with projections of $43 billion by 2020, and $93.1 billion by 2025. The growth is largely attributed to expanded use of batteries in personal electronic devices as well as demands from emerging grid storage and transportation markets. In particular, the global aerospace and defense market is projected to grow at a compound annual growth rate (CAGR) of 4.8% and forecasted to reach $200 million by 2022.

Additionally, the vehicle/automotive sector has experienced the greatest demand growth due to favorable incentives and technological innovation, leading to fast electrified vehicle adoption as well as expansion of DoD capabilities for surveillance and reconnaissance. Considerations prompting battery innovation for automotive applications include balancing safety, cost, and performance for the next-generation of "advanced" lithium-ion technology, with these advanced Li-ion batteries projected to overtake current Li-ion battery's market share by 2027. However, in order for electrified vehicles to be economically viable on a global scale, a target of <$150/kWh must be achieved to compete with internal combustion engines (S100/kWh).

Of secondary interest is high rate metal electrowinning from mining operations.

There is high interest in lithium batteries in general and high rate electrodeposition (charging) in particular. Recently, papers suggesting pulse charging have been reported as an approach to eliminate dendrite formation during high rate charging. See Yang et al., Effects of Pulse Plating on Lithium Electrodepository Morphology, and Cycling Efficiency, Journal of Power Sources 272 (2014) 900-908 incorporated herein by this reference. These approaches have been unsuccessful and are not likely to succeed as dendrite formation is a stochastic process and can likely never be completely and assuredly eliminated.

Although studied for at least 50 years, a complete and detailed mechanistic understanding of dendrite growth remains elusive. Generally, during electrodeposition (or charging of batteries), stochastic processes lead to localized surface roughness or imperfections on the plated surface. These local imperfections represent high current density areas for subsequent material deposition resulting in dendrite growth. The growth of dendrites is accelerated as the electrodeposition rate approaches the limiting current density as evident by the resultant fractal patterns. Limiting current density denotes the maximum faradaic current density and occurs when the rate of charge transfer exceeds rate of reactant mass transport to the electrode surface. Once the limiting current density is reached, the rate of faradaic reactions approach a maximum since the reactant concentration approaches zero at the surface. Thus, methods of increasing the limiting current density would necessarily involve controlling the concentration gradients near the electrode surface.

In conventional copper electroplating, chemical additions are included to address issues of copper deposit roughness. A chemical additive approach analogous to copper plating has been considered for avoidance of lithium dendrite formation however, the continual replenishment of chemical additions is challenging for sealed batteries throughout the operational lifetime. Specifically, in metal plating, the chemical additives are continually replenished in the plating bath until eventually the bath is "dumped" and a new bath is established. This is not practical for lithium batteries and since dendrite formation is a stochastic process, a certain amount of dendrite formation will occur even with a well-designed additive package. Furthermore, for some applications such as metal electrowinning where high rate electrodeposition is desired for economic reasons, the addition of additives is not practical.

Mechanistic understanding of dendrite formation related to lithium battery distinguish between two scales and mechanisms leading to dendrite growth:
1) Whiskers—needle-like filaments that grow from their roots at charging current densities below the limiting current,
2) Dendrites—"classical" fractal structures which grow at their tips at charging current densities approaching the limiting current.

While significant research efforts towards mitigating lithium dendritic structures, including electrolyte additives, stabilization of solid-electrolyte interphase (SEI), suppression of lithium whiskers and dendrites and curbing capacity loss resulting from the accretion of electrochemically inactive or "dead" lithium at practical current densities and areal capacities remains elusive. Recent findings indicate successful mitigation of dendritic features by embedding lithium throughout high surface area, porous substrates. These substrates allow for high rate charging and areal capacities—attributed to the high surface area in contact with the electrolyte. In addition, these substrates allow for the confinement of lithium electrodeposits within the bulk pore structure, due to the lower effective local current experienced throughout the entire electrode. Lastly, porous substrates offer an excellent three-dimensional (3D) framework to facilitate charge transfer—especially when considering the intimate contact between the active electrodeposited lithium with the substrate. Although employing porous substrates appear to be a promising strategy towards mitigating dendritic features through confinement within bulk pore structures, the threat of lithium whiskers and dendrites persists at the outer surface of the porous electrode, where lithium dendritic features are not confined and free to grow.

BRIEF SUMMARY OF THE INVENTION

Disclosed herein is a high rate electrodeposition processes for metal electrowinning and charging processes for secondary batteries including lithium and zinc systems that avoid the detrimental impact of dendrite formation.

The inventors and common assignee have pioneered the use of pulse reverse electrolytic principles for electrodeposition in electrolytes devoid of additives. Specifically, commonly assigned patents disclose pulse reverse electroplating processes for copper and other metals that do not use chemical additives as described in U.S. Pat. Nos. 6,203,684; 6,210,555; 6,303,014; 6,309,528; 6,319,384; 6,524,461; 6,551,485; 6,652,727; 6,750,144; 6,827,833; 6,863,793; 6,878,259; 8,603,315; all of which are incorporated by reference. In addition, the inventors and common assignee have pioneered the use of pulse reverse electrolytic principles for electropolishing, as disclosed in U.S. Pat. Nos. 6,402,931; 6,558,231; 7,022,216; 9,006,147; 9,987,699; all of which are incorporated by reference.

The instant invention addresses the problem of dendrite formation during high rate electrodeposition for electrowinning applications of metals such as copper and charging of secondary batteries such as lithium and zinc by tuning the cathodic electrodeposition or charging pulse to minimize the formation of asperities leading to dendrites followed by tuning the anodic electropolishing pulse to remove the micro- or macro-asperities formed during the previous cathodic pulse.

In an embodiment of the invention, the subject electrodeposition and electropolishing pulses are sequenced one after the other.

In another embodiment of the invention, off-times are inserted after the electrodeposition pulses.

In still another embodiment of the invention, off-times are inserted after the electropolishing pulses.

In still another embodiment of the invention, off-times are inserted after both the electrodeposition and electropolishing pulses.

In still another embodiment of the invention, the electrodeposition and electropolishing pulses are tuned to minimize and eliminate micro-asperities.

In still another embodiment of the invention, the electrodeposition and electropolishing pulses are tuned to minimize and eliminate macro-asperities.

In still another embodiment of the invention, the electrodeposition and electropolishing pulses are sequenced to minimize and eliminate first micro-asperities and then macro-asperities.

In still another embodiment of the invention, the electrodeposition and electropolishing pulses are sequenced to minimize and eliminate first macro-asperities and then micro-asperities.

In still another embodiment of the invention, the electrodeposition and electropolishing pulses are sequenced and then looped to minimize and eliminate first macro-asperities and then micro-asperities.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 11A-11B are a graph showing voltage transients from pulse reverse charging corresponding to one waveform.

DETAILED DESCRIPTION OF THE INVENTION

Figure 1:
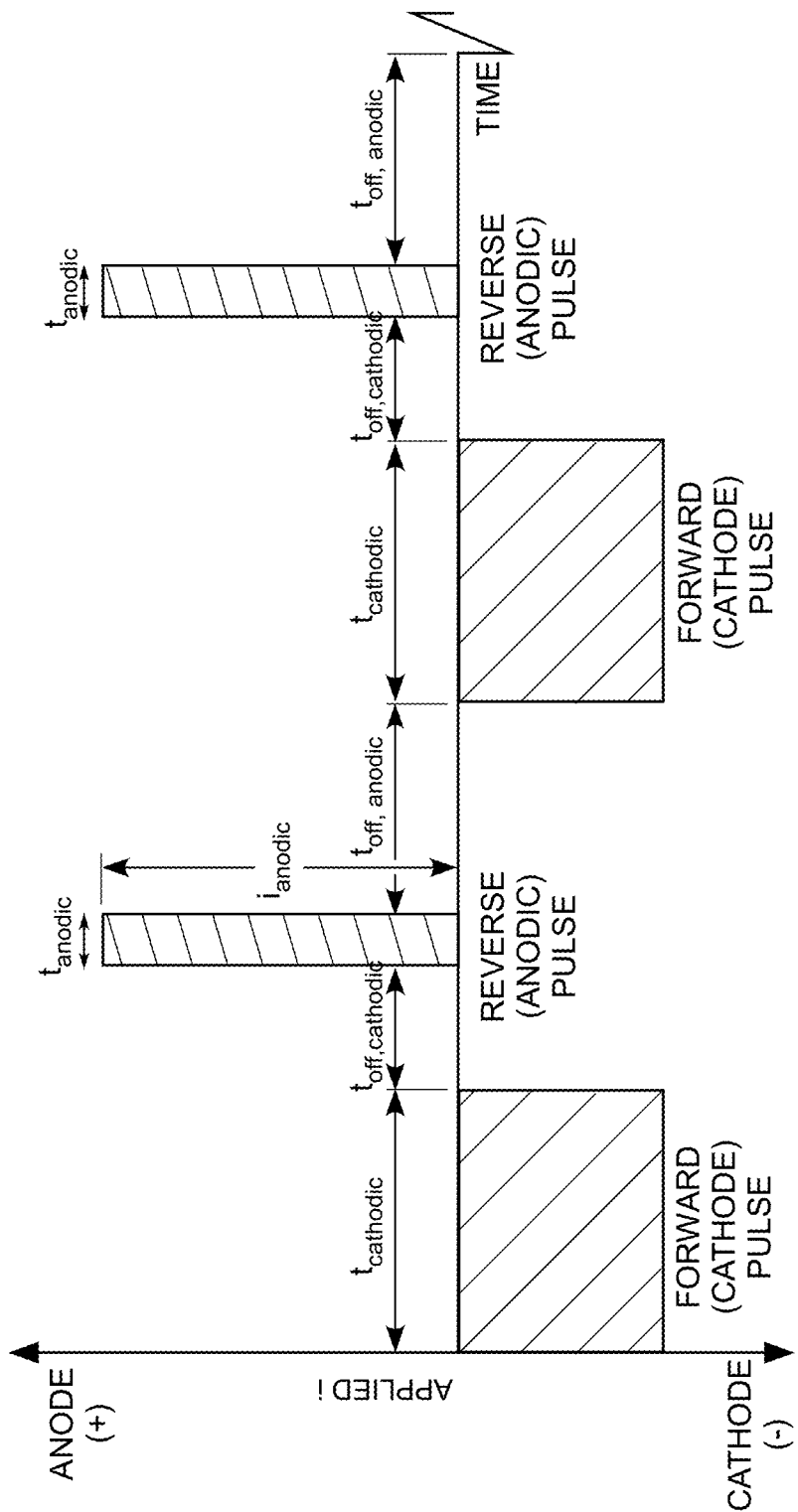
FIG. 1 is a generalized pulse reverse waveform.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In FIG. 1, we present a generic pulse reverse current waveform for a net cathodic or charging (plating) process. The generic description illustrates a cathodic (forward) pulse followed by an off-time, followed by an anodic (reverse) pulse and followed by a second off-time. The cathodic peak current density ($i_{cathodic}$), cathodic on-time ($t_{cathodic}$), cathodic off-time ($t_{off,cathodic}$), anodic peak current density ($i_{anodic}$), anodic on-time ($t_{anodic}$), and anodic off-time ($t_{off,anodic}$) are individual variables for process control. There are numerous embodiments of pulse and pulse reverse current waveforms, a common one being waveforms consisting of only cathodic pulses. Additionally, other common embodiments that include the anodic pulse may eliminate one or both off-times. The sum of the cathodic on-time, anodic on-time, and off-time(s) is the period (T) of the pulse and the inverse of the period is the frequency (f). Specifically, $$T = (t_{cathodic}) + (t_{off,cathodic}) + (t_{anodic}) + (t_{off,anodic}) \tag{1}$$

$$f = (1/T) \tag{2}$$

The cathodic duty cycle ($\gamma_{cathodic}$) is the ratio of the cathodic on-time to the pulse period, and the ratio of the anodic on-time to the pulse period is the anodic duty cycle ($\gamma_{anodic}$). The frequency and duty cycles are additional variables for process control. The average current density ($i_{average}$) or electrodeposition rate is given by:

$$i_{average} = (i_{cathodic})(\gamma_{cathodic}) - (i_{anodic})(\gamma_{anodic}) \quad (3)$$

It should be noted that even though pulse current and pulse reverse current (PC/PRC) waveforms contain off-times and anodic periods, the net plating (i.e. charging) rate is typically the same or higher than in direct current plating. As discussed below, this is attributed to the fact that the "instantaneous" peak currents attained during the pulse on-time can be much higher than that attained during DC plating.

Figure 2:
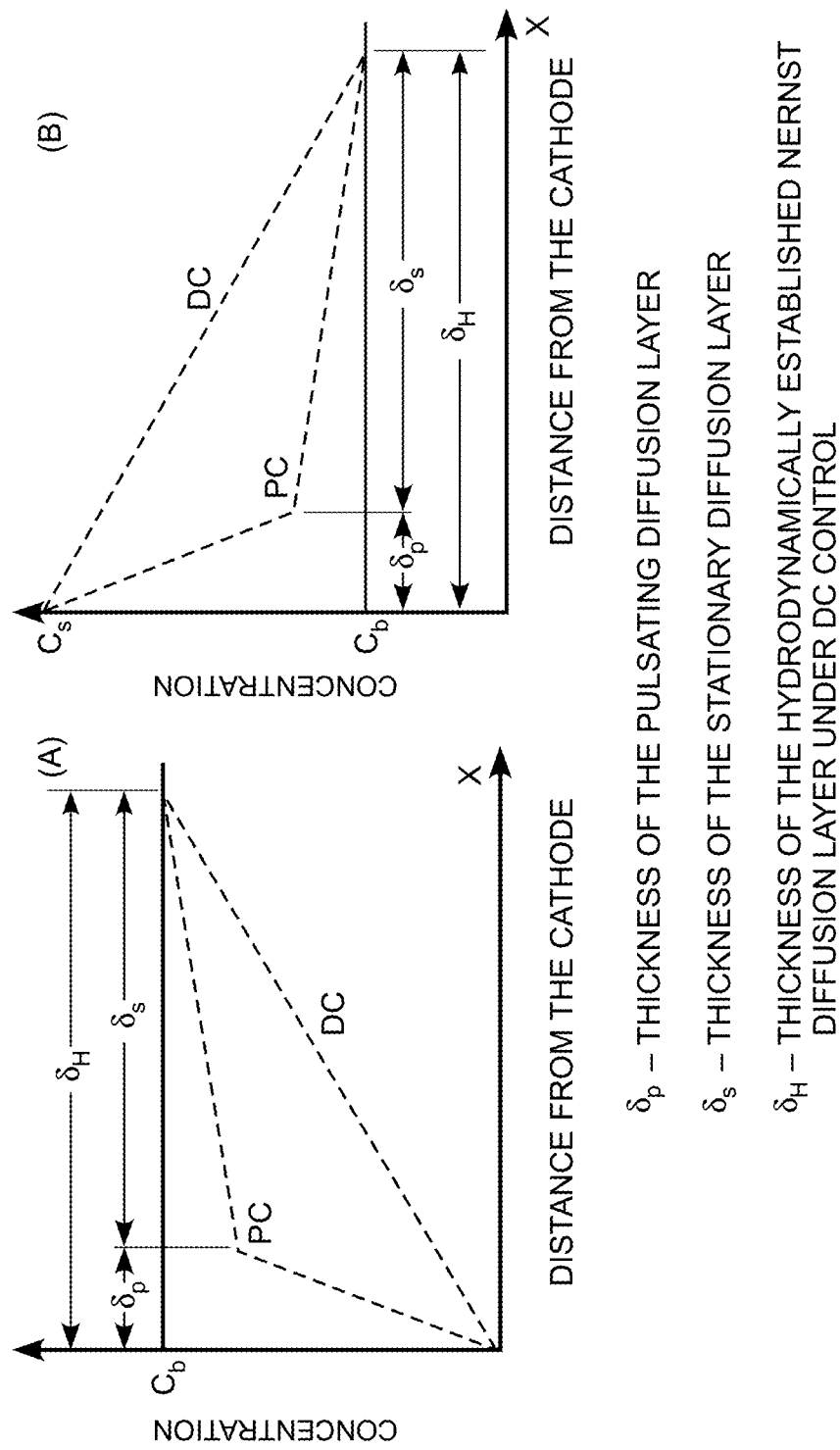
FIG. 2 is a representation of pulsating boundary layer versus a stationary DC boundary layer for (A) cathodic electrodeposition and charging pulse and (B) anodic electropolishing pulse.

Mass transport in pulse current plating is a combination of steady state and non-steady state diffusion processes. The mass transfer limited current density ($i_t$) is related to the reactant concentration gradient ($C_b-C_s$) and to the diffusion layer thickness ($\delta$) by:

$$i_t = -nFD(\partial C/\partial x)_{x=0} = -nFD[(C_b-C_s)/\delta] \quad (4)$$

where n, F, D are the number of equivalents exchanged, Faraday's constant, and diffusivity of the reacting species, respectively. In DC electrolysis, $\delta$ is a time-invariant quantity for a given electrode geometry and hydrodynamic condition. In pulsed electrolysis, however, $\delta$ varies from 0 at the beginning of the pulse to its steady state value when the Nernst diffusion layer, $\delta_N$, is fully established. The corresponding mass transport limiting current density is equal to an infinite value at t=0 and decreases to a steady state value of the DC limiting current density. The advantage of pulse electrolysis is that the current is interrupted before $\delta$ reaches steady state, allowing the reacting ions to diffuse back to the surface and partially or completely replenish the surface concentration to its original value before the next current interruption. Therefore, the concentration of reacting species in the vicinity of the electrode changes with the pulse frequency. During pulse electrolysis, a "duplex diffusion layer" consisting of a pulsating layer, $\delta_p$, and a stationary layer, $\delta_s$ for a deposition process (FIG. 2a). FIG. 2b shows the equivalent diffusion layers for an anodic process, e.g. metal removal. By assuming a linear concentration gradient across the pulsating diffusion layer and conducting a mass balance, the pulsating diffusion layer thickness ($\delta_p$) is:

$$\delta_p \sim (2Dt_{on})^{1/2} \quad (5)$$

where $t_{on}$ is the pulse on-time. When the pulse on time is equal to the transition time, the concentration of reacting species at the interface drops to zero at the end of the pulse. An expression for the transition time, $\tau$, is:

$$\tau \sim ((nF)^2 C_b^2 D)/2i_c^2 \quad (6)$$

For on-times less than the transition time, $\tau$, the concentration of the reacting metal species at the interface remains above zero. For on-times equal to or greater than $\tau$, the concentration of the reacting metal species at the interface is zero, and the process is mass transport limited.

For a DC process, a hydrodynamic Nernst diffusion layer is established. The thickness of the pulsating diffusion layer is related to the pulse current on-time and we refer to it as the "electrodynamic" diffusion layer. The key points used in the development of a pulsed process for electrodeposition are:

(1) the electrodynamic diffusion layer thickness is proportional to pulse on time, and (2) transition time is inversely proportional to the pulse current.

As mass transport is implicated in the dendrite formation and growth mechanism, the use of pulse reverse electrolytic processes is an important benefit.

Current distribution is an important parameter in electrodeposition or battery charging processes. Primary current is governed solely by the geometric effects of the electrochemical cell. Secondary current distribution is governed by kinetic effects and activation overpotentials are considered. Tertiary current distribution is governed by mass transport effects and both activation and concentration overpotentials are considered. The addition of secondary or tertiary current distribution effects tend to make the current distribution more uniform, as compared to primary current distribution alone. For the purposes of this discussion, it is helpful to examine the balance of primary and secondary current distribution in terms of the Wagner number. The Wagner number ($W_a$) is the ratio of the activation polarization (kinetic effects) to the ohmic polarization (geometric effects):

$$W_a = (d\eta/di) \cdot (\kappa/l) \quad (7)$$

where "$d\eta/di$" is the Tafel slope for the reaction of interest, "$\kappa$" is the solution conductivity, and "l" is the characteristic length over which the electrochemical reaction is assumed to take place. For $W_a \ll 1$, primary current distribution prevails and the current distribution is less uniform.

For $W_a \gg 1$, secondary current distribution prevails and the current distribution is more uniform. According to the Wagner number relationship, the tools with which to understand and perhaps manipulate the balance of primary, secondary and tertiary current distribution are:

Tafel slope
Solution conductivity
Characteristic length

The characteristic length, l, may change over time as the plated surface is roughened or smoothed. The solution conductivity is a function of electrolyte chemistry and temperature. Manipulation of the Tafel slope may be done using pulsed electric fields.

A further consideration with regard to current distribution and the balance of primary, secondary and tertiary effects is the relationship between the characteristic length, l, and the diffusion layer. In a macroprofile, the roughness of the surface is large compared with the thickness of the hydrodynamic diffusion layer, $\delta_H$, and when a pulsed electric field is applied, the diffusion layer is compressed to form a pulsating or electrodynamic diffusion layer, $\delta_p$. The pulsating diffusion layer, $\delta_p$, tends to follow the surface contour, and becomes more compressed and thinner as the pulse on-time becomes shorter. In a microprofile, the roughness of the surface is small compared with the thickness of the hydrodynamic diffusion layer, $\delta_H$. In this case, for a long pulse on-time, the pulsating diffusion layer is compressed, but still is much larger than the characteristic length, and the microprofile is maintained. For very short pulse on-times, the pulsating diffusion layer is compressed to the point at which it follows the surface contour, and the system effectively mimics a macroprofile.

A final consideration is that if the applied waveform is designed such that the pulse on time is much longer than the transition time, tertiary current distribution will play an important role. With the addition of tertiary control, the concepts of macroprofile and microprofile and their influence on current distribution become important. Under DC conditions and mass transport control, a macroprofile results in the most uniform current distribution and a nearly conformal deposit. The application of pulse currents generates a smaller macroprofile. Based on experimental observations, for a macroprofile boundary layer condition, relatively long pulse on-times can yield a slightly non-uniform current distribution compared to DC conditions, and relatively short pulse on-times can yield a significantly more non-uniform current distribution than DC conditions. Assuming the same average current, for shorter pulse on-times the relative influence on current distribution shifts from tertiary current distribution control to secondary as well as primary current distribution control. Consequently, as concentration polarization effects are removed, the current distribution becomes less uniform.

Under DC conditions and mass transport control, a microprofile results in the most non-uniform current distribution and a non-conformal deposit. The application of pulse currents with a small enough on-time can convert a microprofile to a macroprofile, establishing a small $\delta_p$. For a microprofile diffusion layer condition, assuming tertiary current distribution control is maintained, short pulse on-times sufficient to convert the microprofile to a macroprofile results in a significantly more uniform current distribution. Conversely, long pulse on-times sufficient to maintain the microprofile results in a slightly more uniform current distribution compared to DC, assuming tertiary control is maintained by selecting on-times and peak currents that ensure to $t_{on} \gg \tau$.

In the case of high rate electrodpeposition or battery charging, we anticipate the occurrence of both micro-asperity whisker and macro-asperity dendrites. The whiskers may represent a microprofile relationship to the boundary layer and the dendrites may represent a macroprofile relationship to the boundary layer. Consequently, by applying the appropriately designed current pulse in terms of peak current and on-time, the current distribution can be effectively focused or de-focused during electrodeposition or charging.

Figure 3:
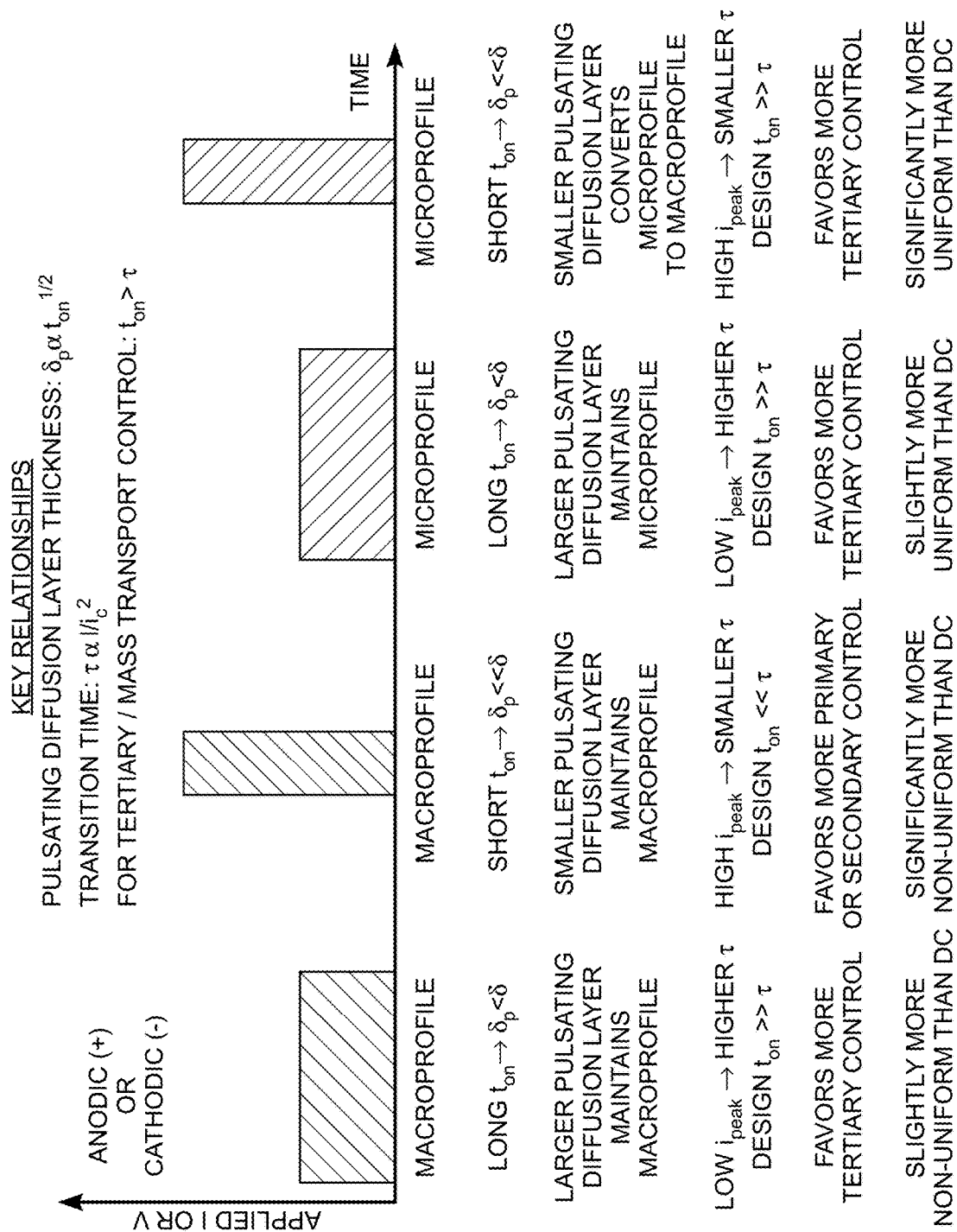
FIG. 3 is a representation of generalized waveform parameter and their influence on current distribution under microprofile and macroprofile conditions.

While these concepts serve as "guiding" principles for our selection and development of specific pulse waveform parameters for specific application, they do not provide a priori guidance for waveform parameter selection. Rather, an amount of limited experimentation is required. We have taken these concepts and have developed a paradigm for waveform parameter selection in terms of current distribution for macroprofile and microprofile condition. There are four pulse waveform types, independent of anodic or cathodic orientation that we generally use to tune waveforms for specific applications, and these are summarized in FIG. 3. While there are additional permutations that may be considered, but these are the ones that have proven most useful in our development activities. For electrochemical processes that are close to 100% faradaic efficiency for both metal deposition and metal dissolution, combining these cathodic and anodic pulses can create net waveforms that will achieve the overall desired process result. Combining multiple waveforms into sequences may also be required, as will be shown in the examples to follow. This is easily done with modem programmable rectifiers—a far simpler change than having to modify electrolytes or electrode geometries to achieve the same effect.

Grain size in electrodeposited coatings, and hence mechanical properties such as ductility, is also a function of the pulse current plating parameters. During the electrodeposition or charging process, as ions enter the electrified interface between the solution and the cathode, a charge transfer reaction results in the formation of adatoms on the surface of the cathode. Electrocrystallisation is the mechanism by which adatoms are incorporated into a crystal lattice during plating. Electrocrystallization can occur by either growth on previously deposited crystals or nucleation of new crystals. If electrocrystallization occurs by growth on previously deposited crystals, the resulting deposit will consist of large grains. In contrast, if electrocrystallization occurs by nucleation of new crystals, the resulting deposit will consist of small grains or even amorphous deposits. The nucleation rate (v) is given by:

$$v = k_1 \exp(-k_2/|\eta|) \tag{8}$$

where $k_1$ is proportionality constant, $k_2$ is related to the amount of energy needed for the two-dimensional nucleation, and $\eta$ is the overpotential. The nucleation rate increases exponentially with increasing overpotential.

Pulse current plating generally utilizes peak current densities that are much higher than the current densities used in DC plating. Therefore, the instantaneous current or voltage pulses, and hence the overpotentials during pulse current plating, may be higher than during DC plating. Consequently, pulse current plating can promote nucleation and a finer grained structure compared to DC plating. In fact, we have taken the "grain size" concept to the extreme by forming 4 to 5 nm catalyst particles for gas diffusion electrode applications as described in U.S. Pat. Nos. 6,080,504; 5,084,144; all of which are incorporated by reference. The impact of grain size during high rate electrodeposition and battery charging also have an effect on whisker and dendrite formation.

Figure 4:
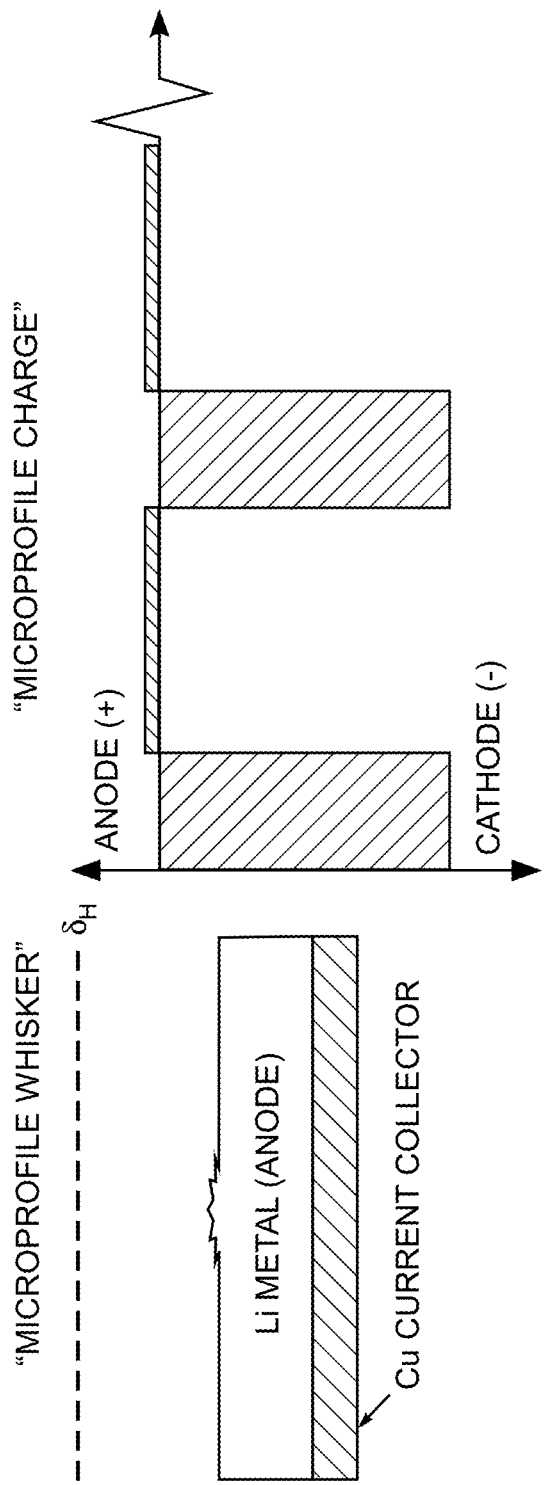
FIG. 4 is a representation of a surface with a micro-asperity and the generalized waveform parameters for its minimization and removal.

In FIG. 4, we illustrate the whisker and type of waveform parameters of interest for the microprofile charging case. Note, the average charging rate, compensating for reverse/off times, will be tuned to be greater than the DC charging rate of ~20 mA/cm². Based on the discussion above, the forward cathodic pulse is tuned to deposit lithium with minimal surface imperfections, i.e. whiskers, under microprofile conditions. However, as surface imperfections, in particular whiskers are assumed to be a stochastic process, they will occur. Consequently, the reverse anodic pulse is tuned to selectively remove the whiskers, in essence polishing the surface.

Figure 5:
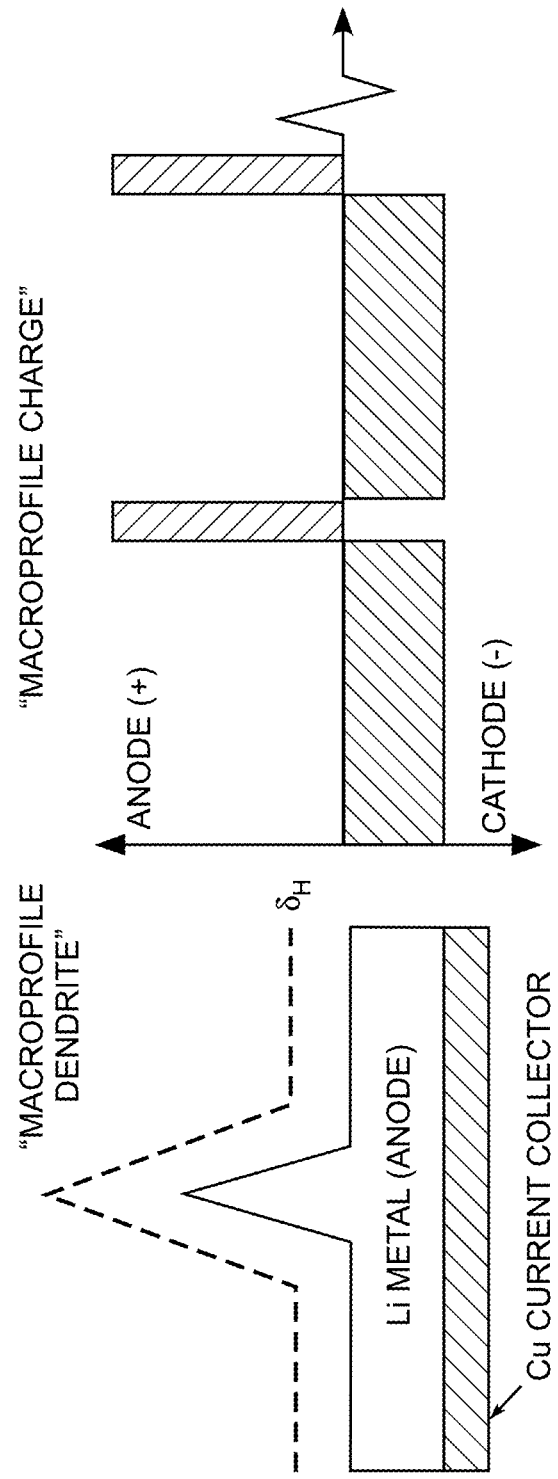
FIG. 5 is a representation of a surface with a macro-asperity and the generalized waveform parameters for its minimization and removal.

In FIG. 5, we illustrate the growing dendrite and type of waveform parameters of interest for the macroprofile charging case. Note, the average charging rate, compensating for reverse/off times, will be tuned to be greater than the DC charging rate of ~20 mA/cm². Based on the discussion above, the forward cathodic pulse is tuned to deposit lithium with minimal surface imperfections, i.e. whiskers, under microprofile conditions. However, as surface imperfections, in particular whiskers are assumed to be a stochastic process, they will occur. Dendrites will grow from the whiskers. Consequently, the reverse anodic pulse is tuned to selectively remove the dendrites, in essence polishing the surface. An off-time or relaxation period may follow either of both of the cathodic and anodic pulses shown in FIG. 4 and FIG. 5.

The cathodic charge ($Q_{cathodic}$) density is:

$$Q_{cathodic} = (i_{cathodic})(t_{cathodic}) \tag{9}$$

The anodic charge ($Q_{anodic}$) density is:

$$Q_{anodic} = (i_{anodic})(t_{anodic}) \tag{10}$$

The cathodic to anodic charge ratio is:

$$Q_{cathodic}/Q_{anodic} \tag{11}$$

The ordinate in FIG. 4 and FIG. 5 is cathodic (−) and anodic (+) and may represent either current or voltage although battery charging and electrowinning operations are generally conducted under current control.

The electrolyte (battery electrolyte or electrowinning electrolyte) is preferably substantially devoid of levelers, brighteners and other additives commonly known in the plating industry to control deposit grain size (and hence mechanical properties) and/or create a more level deposit. Note: in the plating industry, these additives are replenished based the amount of metal deposited (charge passed) from the subject plating bath. See U.S. Pat. No. 6,319,384 incorporated herein by this reference.

Featured as shown in FIG. 4 is a method for depositing a layer of metal resulting in a smooth metal deposit devoid of dendrites from an electrolyte using a pulse reverse current waveform to eliminate microasperities. In some examples, Li, and/or Zn is used for high-rate battery charging and Cu for high-rate electrowinning.

The preferred metal electrolyte is substantially devoid of levelers, brighteners and other additives. Microasperities are less than 100 microns.

A preferred cathodic to anodic Charge ratio is >1, preferably >10, preferably >50, preferably >100. A preferred average Current Density is >5 mA/cm$^2$, preferably >10 mA/cm$^2$, preferably >20 mA/cm$^2$. A preferred frequency is 0.10 to 1000 Hz. A preferred cathodic duty cycle is <50%, preferably <30%, preferably <10%. A preferred anodic duty cycle is >50%, preferably >70%, preferably >90%.

According to the method of FIG. 5, it is preferred that any macroasperities are >100 microns; the cathodic to anodic charge ratio is >1, preferably >10, preferably >50, preferably >100; the average current density is >5 mA/cm$^2$, preferably >10 mA/cm$^2$, preferably >20 mA/cm$^2$; the frequency is 0.10 to 1000 Hz; the cathodic duty cycle is >50%, preferably >70%, preferably >90%; and the anodic duty cycle is <50%, preferably <30%, preferably <10%.

Figure 6:
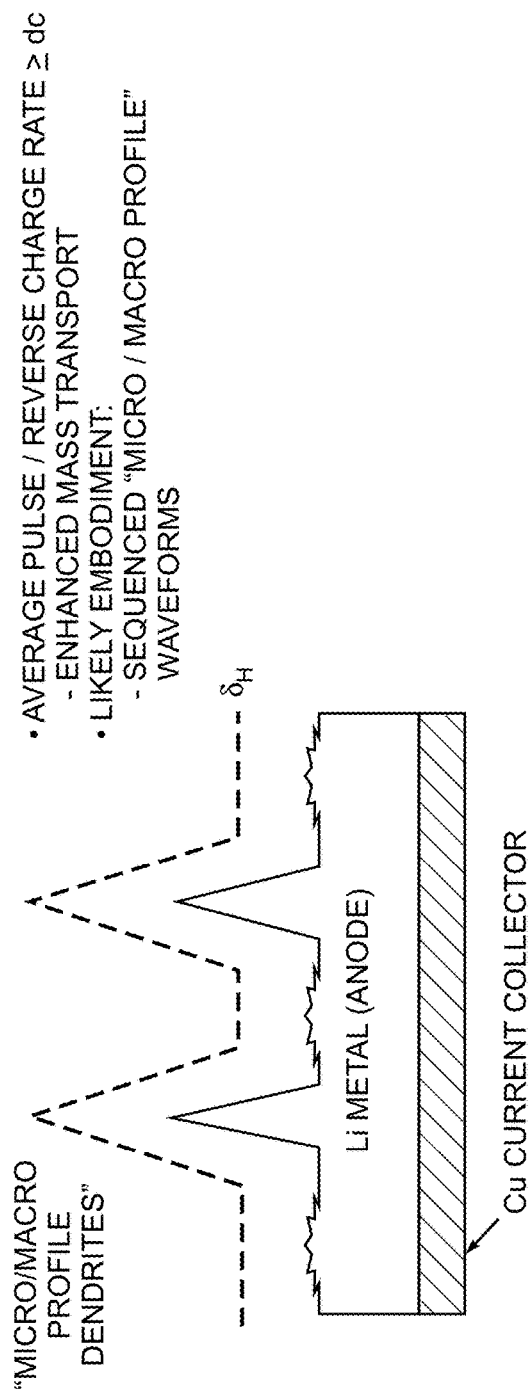
FIG. 6 is a representation of surface with micro-asperities and macro-asperities and the generalized waveform parameters applied in sequence or loops for its minimization and removal.
Figure 6:
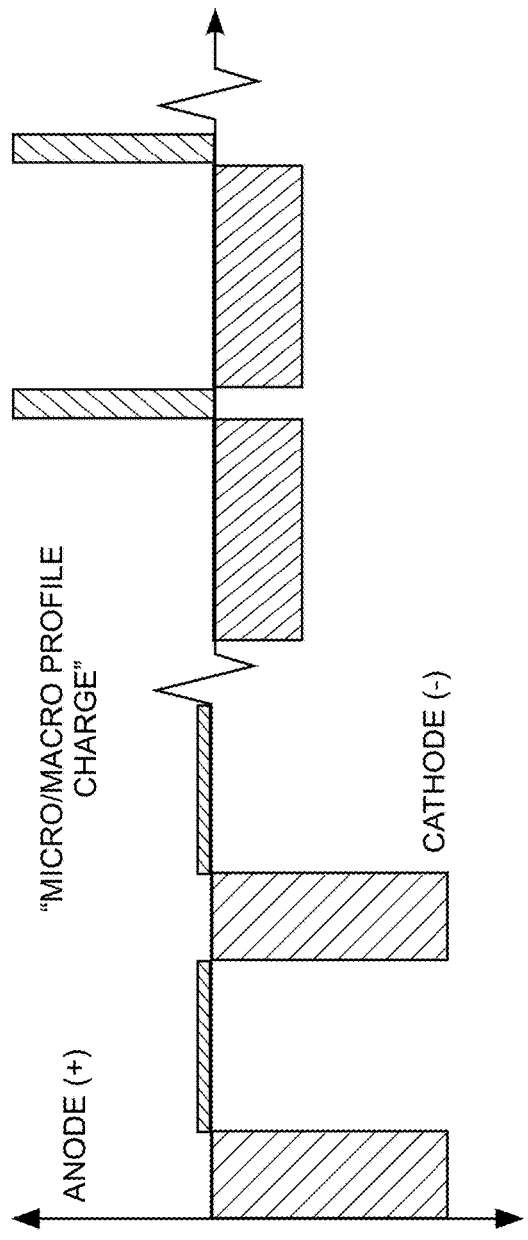
Figure 8:
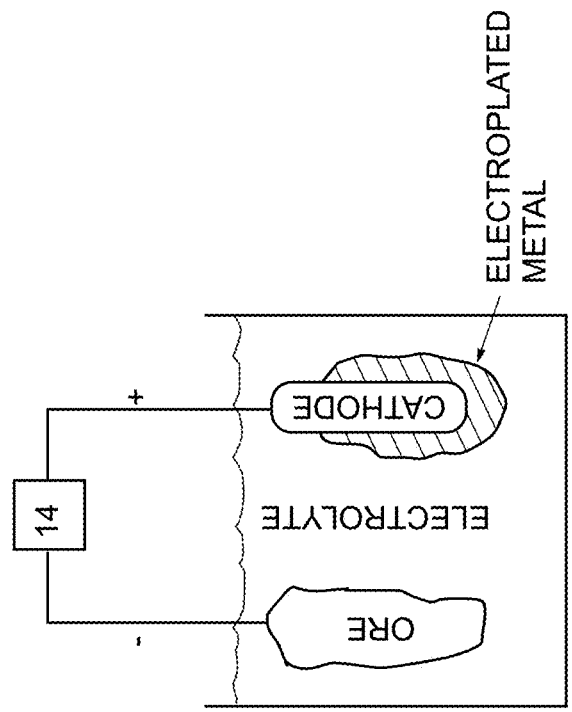
FIG. 8 is a schematic view of an electrowinning process in accordance with the waveform parameters of FIG. 4, 5, or 6.
Figure 7:
FIG. 7 is a schematic view of a battery being charged in accordance with the waveform parameters of FIG. 4, 5, or 6.

FIG. 7 shows a battery 10 charged by a charger 12 configured to apply the waveforms of FIG. 4, 5, or 6. FIG. 8 shows an electrowinning process where charger 14 applies the waveform of FIG. 4, 5, or 6.

Finally, we anticipate that during the time-scales desired for long cycle life lithium batteries, we anticipate the lithium surface may contain both whiskers (nascent dendrites) and growing dendrites. Consequently, we may find it desirable to sequence and loop the pulse reverse electrodeposition and charging waveforms between microprofile and macroprofile parameters as illustrated in FIG. 6.

Figure 9:
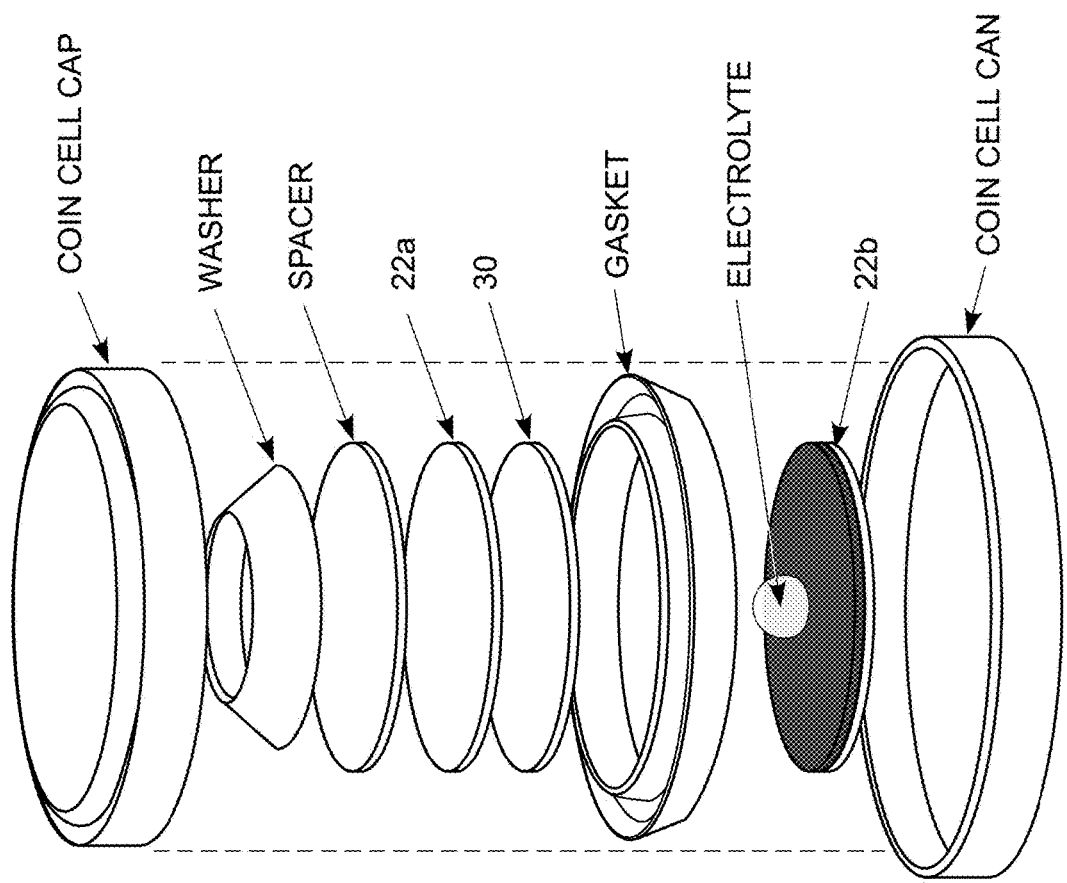
FIG. 9 is an exploded view of a coin cell.

Pulse Reverse charging was explored as an approach for lithium dendrite mitigation during high rate charging. Coin cells containing symmetric lithium anode/lithium cathode (Li/Li) were constructed to demonstrate the Pulse Reverse Charging concept. FIG. 9 depicts the coin cell components where the electrolyte-soaked separator 20 is flanked on both sides by lithium metal electrodes 22a, 22b. While a lithium cathode/lithium anode configuration is not a battery couple, by using lithium as both electrodes, both charge and discharge cycles impacted dendrite formation on the anode and cathode, respectively. In other words, "charge" is defined as electrochemical reduction of lithium ions onto the anode. Conversely, discharge is the electrochemical oxidation of lithium from the anode. The other components (spacer, washer) serve to impart mechanical pressure and ensure intimate contact while maintain a hermetically sealing environment contained within the cap/gasket/can.

Various waveform parameters, "A", "B", and "C", listed in Table 1, were employed in the following examples to demonstrate conventional direct current (DC) charging and Pulse Reverse Charing. Current densities in Table 1 (~7 mA/cm$^2$) reflect significantly higher rates than typically recommended charging rates (200 μA/cm$^2$ to 1 mA/cm$^2$) for commercial coin cells. The resulting voltage transients were examined for indications of dendrites. Monitoring the voltage transient for instabilities, such as voltage spikes or fluctuations, is often leveraged as an indirect indicator of lithium

TABLE 1

Waveform parameters for coin cell charge/discharge cycling.

| Waveform | Current density (mA/cm$^2$) | Pulse duration (s) | Total duration (s) | Notes |
|---|---|---|---|---|
| A | 7 | N/A | 3600 | DC Charge |
|  | −7 | N/A | 3600 | DC Discharge |
| B | 50 (forward) | 0.02 | 3600 | Pulse Reverse Charge |
|  | −3.5 (reverse) | 0.08 |  |  |
|  | 3.5 (forward) | 0.08 | 3600 | Pulse Reverse Discharge |
|  | −50 (reverse) | 0.02 |  |  |
| C | 10.6 (forward) | 0.08 | 3600 | Pulse Reverse Charge |
|  | −7 (reverse) | 0.02 |  |  |
|  | 7 (foward) | 0.02 | 3600 | Pulse Reverse Discharge |
|  | −10.6 (reverse) | 0.08 |  |  | dendrite and the onset of short-circuit formation.

Example I

Figure 10:
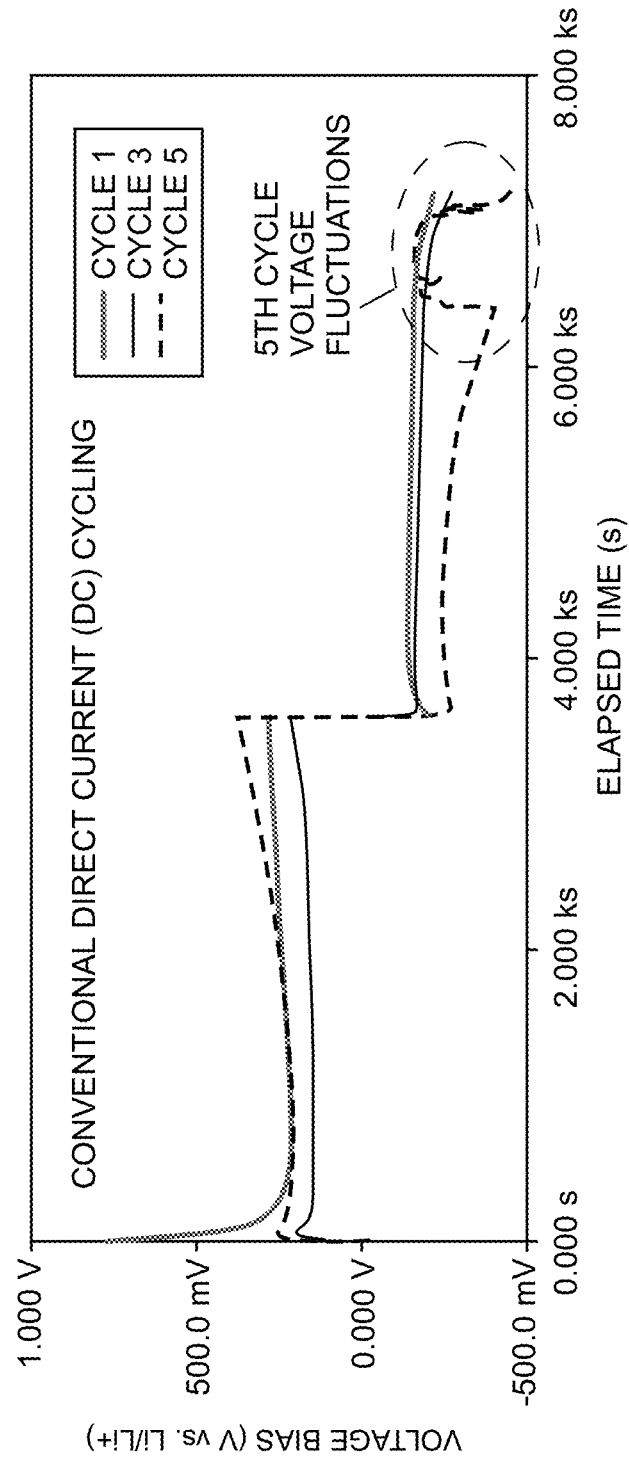
FIG. 10 is a graph showing voltage transients from conventional DC cycling.

FIG. 10 depicts the typical DC charge (designated as the positive voltage segments) and corresponding DC discharge (negative voltage segments) transient for a Li/Li symmetrical coin cell and is designated as "Waveform A" in Table 1. The voltage transient is a reflection of the driving force which is manifested as an overpotential, or voltage bias between the two electrodes, necessary to overcome the resistances in order to initiate and sustain the electrodeposition (or electrodissolution) process at a given electrochemical current. Thus, any significant deviations in the resistance experienced between the anode/cathode, for example resulting from a dendrite-facilitated short-circuit, would be manifested as a voltage fluctuation. FIG. 10 depicts cycles 1, 3, and 5 of the (+/−) 7 mA/cm$^2$ charge (positive voltages) and discharge (negative voltages) of a Li/Li symmetric coin cell. It is evident that cycles 1 and 3 exhibited a smooth voltage transient during both charge and discharge of the cell. However, in cycle 5, voltage fluctuations during the discharge segment was attributed to lithium dendrites and the onset of short-circuit. Efforts to inhibit or mitigate dendrites focused on controlling the lithium ion concentration at the surface of the lithium electrode through various Pulse Reverse waveforms.

Example II

FIG. 11A shows a representative voltage response from applying a pulse reverse "Waveform B" (Table 1) to a Li/Li symmetric coin cell. The current amplitude and duration of the forward and reverse pulses were constrained to yield a net charge passed (in coulombs, for example), which was equivalent to the analogous DC case (FIG. 10 corresponding to "Waveform A" in Table 1) for both the coin cell charge and discharge cycles. Thus, a comparable amount of lithium was deposited and removed via both the conventional DC as well as the Pulse Reverse cycling strategies within the same period of time. By adjusting the x-axis scale, voltage fluctuations experienced during "Waveform B" can be observed in FIG. 11B. Notably in FIG. 11B the voltage fluctuations were delayed until the charge segment of the 6th cycle. In other words, evidence of lithium dendrites and the onset of short circuit was delayed until the 6th cycle and support the claim that controlling the lithium ion concentration at the lithium metal electrode via Pulse/Pulse Reverse waveforms can inhibit/mitigate lithium dendrites.

Application of Pulse Reverse charging delays the lithium dendrite formation from the 5th to the 6th cycle or a 20% increase in cycle life. Noted that in these tests the Li/Li symmetric coin cells were cycled at relatively extreme current densities of (+/−) 7 mA/cm$^2$. With more realistic cycling conditions, the dendrite mitigation benefits imparted by Pulse Reverse charging would be amplified since lower current densities would generally promote fewer asperities throughout the operational lifetime of the cell. Specifically, Pulse Reverse charging over the span of hundreds/thousands of cycles would tune the lithium metal electrode surface topography by iteratively and selectively electropolishing the asperities and mitigating other unavoidable subsurface precursors leading to lithium dendrites.

Example III

Figure 12A:
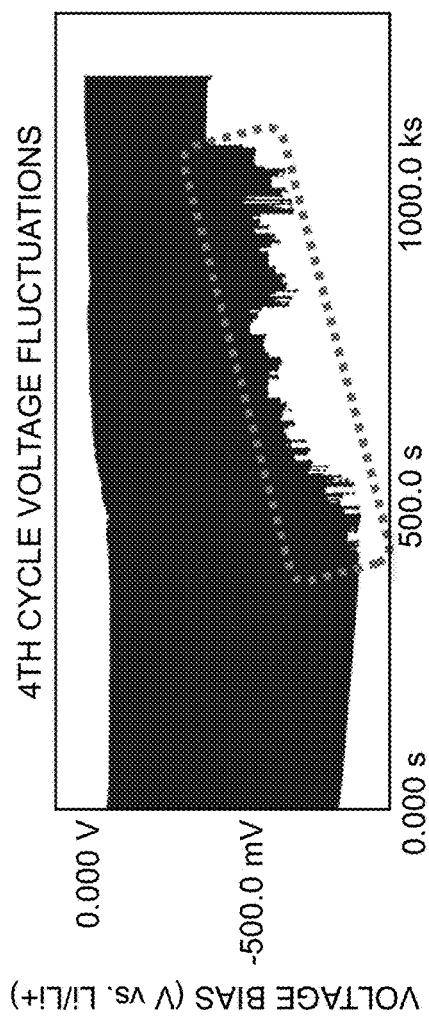
FIGS. 12A-12C show voltage transients from pulse reverse charging corresponding to another waveform.
Figure 12B:
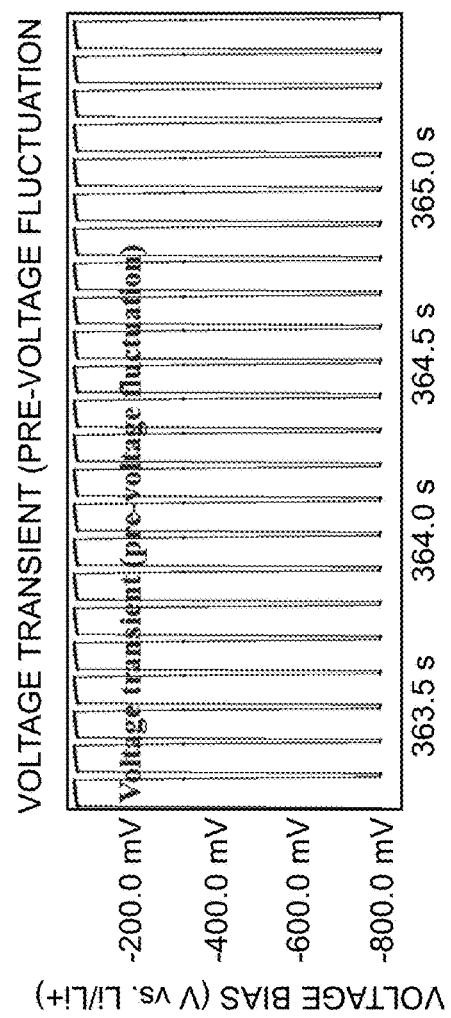
Figure 12C:
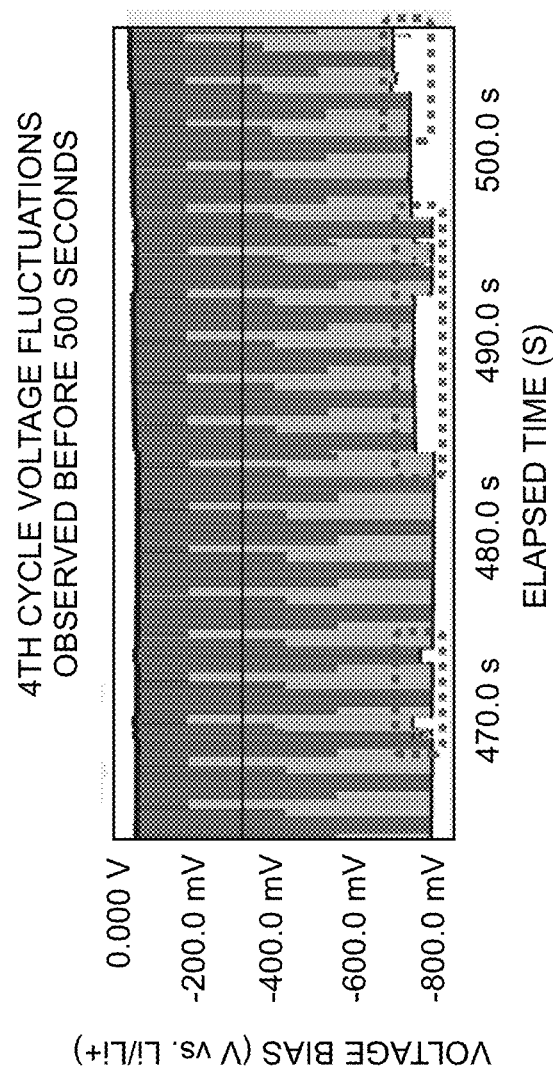

It should also be emphasized that not all pulse reverse waveforms are appropriate for dendrite mitigation FIG. 12 is an example of another pulse waveform, designated as "Waveform C" and with corresponding parameters in Table 1, which was also constrained to have an net charge passed that is equivalent to the DC counterpart described in FIG. 10 ("Waveform A", Table 1). FIG. 12A depicts the discharge segment (negative voltages) during the 4th cycle, which exhibited voltage fluctuations shortly before 500 seconds and continued beyond 1000 seconds. The blue colored trace appears to be a solid block, which is a manifestation of blue data points whose interval is significantly smaller than the plotted x-axis time scale. FIG. 12B exemplifies a small portion of the voltage transient response, with an x-axis scale that resolves the individual pulse features centered around 365 seconds—significantly before the voltage fluctuations that was mentioned in FIG. 12A. FIG. 12C depicts the onset of voltage fluctuations experienced shortly before 500 seconds. The appearance of the voltage fluctuations during cycle 4 suggests that "Waveform C" appeared to have accelerated the dendrite-facilitated short-circuit time compared to the conventional DC analog, which experienced the voltage fluctuations during cycle 5, as described in FIG. 10. Thus, the choice of pulse/pulse reverse waveforms appear to influence the lithium dendrite behavior.

The following U.S. patents are hereby incorporated herein by this reference: U.S. Pat. Nos. 9,987,699; 9,006,147; 8,603,315; 7,022,216; 6,878,259; 6,863,793; 6,827,833; 6,750,144; 6,558,231; 6,652,727; 6,551,485; 6,524,461; 6,402,931; 6,319,384; 6,309,528; 6,303,014; 6,210,555; 6,203,684; 6,080,504; 5,084,144.

The following references are also incorporated herein by this reference: Mayers, M. Z.; Kaminski, J. W.; Miller, T. F. J. Phys. Chem. C, 2012, 116 (50), pp 26214-26221; Aryanfar, A. et. al. Dynamics of Lithium Dendrite Growth and Inhibition: Pulse Charging Experiments and Monte Carlo Calculations J. Phys. Chem. Lett., 2014, 5 (10), pp 1721-1726; Li et al., Sci. Adv. 2017; 3: e1701246; Keil, P.; Jossen, A. Charging protocols for lithium-ion batteries and their impact on cycle life—An experimental study with different 18650 high-power cells, Journal of Energy Storage, 6, 2016, 125-141; Yang, H.; Fey, E. O.; Trimm, B. D.; Dimitrov, N.; Whittingham, M. S. Effects of Pulse Plating on lithium electrodeposition, morphology and cycling efficiency, Journal of Power Sources, 272, 2014, 900-908.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method of electrowinning a metal, the method comprising:
    applying a microprofile charge to the electrowinning cell including:
        forward cathodic pulses to deposit metal on the electrowinning anode, and
        between selected successive forward cathodic pulses, applying one or more reverse anodic pulses to polish the electrowinning anode; and
    subsequent to the application of the microprofile charge to the electrowinning cell, applying a macroprofile charge to the electrowinning cell including:
        forward cathodic pulses to deposit metal on the electrowinning anode, and
        between selected successful forward cathodic pulses applying one or more reverse anodic pulses to polish the electrowinning anode; and
    said microprofile charge and macroprofile charge applied to the electrowinning cell sequentially.

2. The method of claim 1 in which the microprofile charge includes a cathodic to anodic charge ratio of greater than one, an average current density of greater than 5 mA/cm2, a frequency of between 0.10 to 100 Hz, a cathodic duty cycle of less than 10%, and an anodic duty cycle of greater than 50%.

3. The method of claim 1 where in the macroprofile charge includes a cathodic to anodic charge ratio of greater than 1, an average current density of greater than 5 mA/cm2, a frequency of 0.102 100 Hz, a cathodic duty cycle of greater than 50%, and anodic duty cycle of less than 10%.

* * * * *